Dec. 31, 1929.  J. F. O'CONNOR  1,742,003
SHOCK ABSORBING DEVICE FOR VEHICLES
Filed Oct. 13, 1926
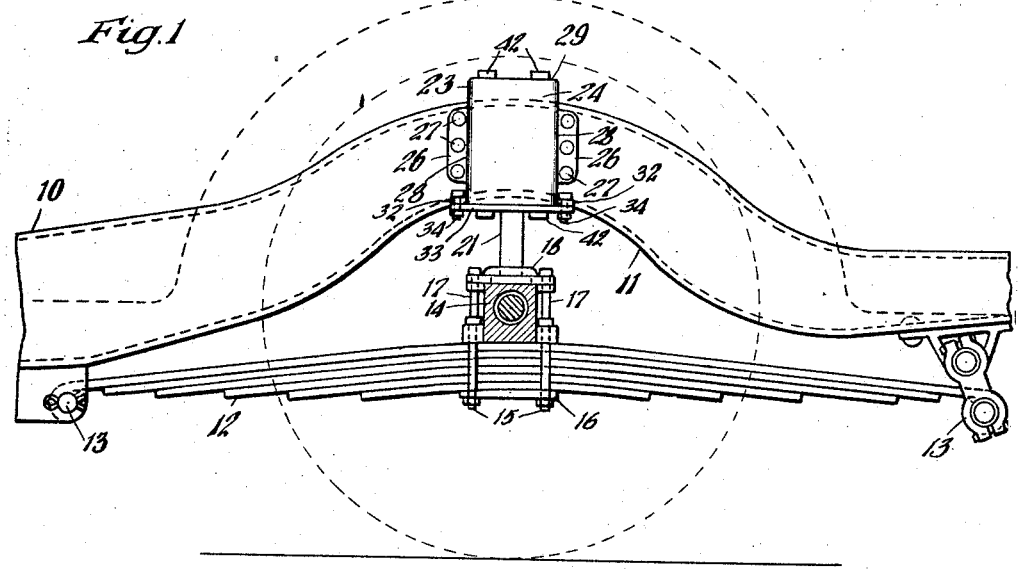
Witness
Wm. Geiger
Inventor
John F. O'Connor
George Haupt
By His Atty.

Patented Dec. 31, 1929

1,742,003

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK-ABSORBING DEVICE FOR VEHICLES

Application filed October 13, 1926. Serial No. 141,255.

This invention relates to shock absorbing devices for vehicles.

An object of the invention is to provide shock absorbing mechanism more particularly adapted for use in connection with heavy vehicles of the bus type, and wherein means are provided which are interposed between the usual springs which support the vehicle body and the vehicle body, and so arranged that the shock absorbing mechanism cooperates with the springs to retard the movement thereof in opposite directions so as to limit travel and at the same time aid the springs in absorbing the shocks.

Another object of the invention is to provide a construction of the character above referred to in which a casing is affixed to the vehicle body and a tapered plunger secured to the axle housing, said casing including yieldably cushioned elements which co-operate with the plunger so as to exert a combined cushioning and frictional effect thereupon when the axle housing and springs carried thereby move with reference to the vehicle body.

Other and further objects of the invention will more clearly appear from the description and claims hereinafter following.

In the drawings forming part of this specification, Figure 1 is a side elevation of a fragment of a vehicle side frame or chassis, with the usual rear axle housing and spring assembly for supporting the vehicle body, and showing my invention applied thereto. Figure 2 is a vertical transverse sectional view, partly in elevation, substantially on the line 2—2 of Figure 3. Figure 3 is a horizontal sectional view of the invention substantially on the line 3—3 of Figure 2. Figure 4 is a horizontal sectional view of the invention corresponding substantially to line 4—4 of Figure 2. And Figure 5 is an enlarged detailed perspective view of one of the wedge members used in connection with the invention.

As shown in the drawings, a fragment of the chassis or frame member of the vehicle is indicated at 10, said frame being off-set as indicated at 11. The off-set 11 is spanned by the usual spring assembly 12, the ends of which are secured to the frame member 10 by suitable shackles 13—13. The central portion of the spring assembly is connected to the axle housing 14 by means of clamping bolts 15—15 which extend through suitable flanges on the axle housing 14 and through a connecting plate 16 arranged along the under surface of the spring assembly.

Secured to the axle housing 14, by means of bolts 17—17 is a plate 18 which is provided with an apertured off-set 19 providing an annular shoulder beneath which is disposed the head 20 of an actuating element or plunger 21 of the mechanism. The plunger 21 as shown is rectangular in cross section, and the upper portion 22 of said plunger tapers from a suitable point adjacent the head of the plunger toward the free end thereof, said plunger being arranged to extend through a casing 23 mounted upon the frame member 10 of the vehicle.

The casing or housing 23 is provided with front and rear walls 24 and 25, the rear wall having extensions thereon providing flanges 26—26 through which are extended rivets 27—27 which secure the housing to the web of the frame member 10, the casing also includes side walls 28—28 and a top wall 29, the latter being provided with a central opening 30, to permit passage of the plunger 21, and being also provided with apertures 31—31, one of which is disposed at each side of the central aperture 30, for a purpose presently to be described. The lower ends of the side walls 28—28 are provided with flanges 32—32 to which is detachably secured the bottom wall 33 by means of bolts 34—34. The bottom wall 33 is provided with a central aperture 35 to permit passage of the plunger 21, the bottom plate 33 being provided with apertures 36—36, one of which is disposed at each side of the central aperture 35.

Mounted in the casing are upper and lower wedge castings 37 and 38. Referring to the lower casting 38, the same comprises side walls 39—39, between which are formed oppositely inclined spaced wedge surfaces 40—40, which diverge from the bottom toward the top of the casting, each side wall 39 having an extension 390 to provide a stop. At the outer sides of the wedge surfaces 40—40 there are provided bottom walls or bearing portions 41—41, each of which is provided with a guide stem 42, adapted to project through the related aperture 36 in the bottom wall of the casing. Disposed about each of the stems 42 is a coiled spring 43 the upper end of which bears upon the related portion 41 of the wedge casting and the lower end of which bears against the bottom wall 33 of the casing. The upper wedge casting 37, and the associated parts are identical in construction to the wedge casting 38, except for its opposite disposition, and similar reference characters will be utilized to designate similar parts of the castings 37 and 38, the stems upon the casting 37 extending through the apertures 31 in the top wall 29 of the casing. Mounted in the casing, at each side of the plunger 21 is a friction shoe 44, said shoes being identically similar in construction except for their opposite disposition, and each of the same includes a vertical tapered wedge face 45 adapted to frictionally engage the adjacent surface of the tapered plunger 21, and each shoe also includes oppositely inclined wedge faces 46—46 which bear against the wedge faces 40 of the upper and lower wedge castings 37 and 38.

In operation, assuming relative movement of the spring assembly 12 toward the frame member 10, this movement will effect upward reciprocation of the plunger 21 with respect to the housing 23, and due to the upwardly converging surfaces of the plunger 21, upward movement thereof will displace the friction shoes 44 laterally with reference to the plunger and the housing 23, developing frictional resistance between the engaging surfaces of the plunger 21 and of the shoes 44—44. Lateral movement of the shoes 44—44 in opposite directions brings about movement of the upper and lower castings 37 and 38 at an angle to the movement of the shoes 44—44, which movement is resisted by the coiled springs 43—43, frictional resistance being developed between the upper friction surfaces of both shoes and the friction surfaces of the wedge casting 37, while frictional resistance is also developed between the friction surfaces at the lower portions of each friction shoe and the adjacent friction surfaces of the wedge casting 38, the wedge castings 37 and 38 being guided in their movement by the guide stems 42—42 extending through the walls of the housing 23. Upon relative movement of the spring assembly 12 and frame member 10 apart, or in a direction opposite to that just above described, the plunger 21 is withdrawn from the housing 23 permitting approach of the friction shoes 44—44 and of the wedge castings 37 and 38, the latter being returned to position under the influence of the springs 43—43, and during this action the friction surfaces provided by the shoes, sides of the plunger 21, and the upper and lower friction surfaces of the shoes 44 and of the wedge castings 37 and 38, develop resistance against withdrawal of the plunger and retard separation of the spring assembly 12 and the frame member 10.

While I have herein shown and described what I consider the preferred manner in carrying out the invention, the same is merely illustrative, and I contemplate all changes and modifications which come within the scope of the claims appended hereto.

I claim:

1. In a shock absorbing mechanism for vehicles, the combination with relatively movable members carried by the vehicle body structure and supporting spring, respectively; of friction elements carried by one of said members; and an actuating element carried by the other of said members and movable between said friction elements and in frictional contact therewith; and yielding means having wedging engagement with said friction elements for forcing the same against the actuating element.

2. In a shock absorbing mechanism, the combination with the body member of a vehicle and a spring member for supporting said body member; a plunger mounted upon one of said members; spaced wedge members carried by the other of said members and movable in a direction common with the direction of movement of said plunger, each of said wedge members being provided with oppositely extending wedge surfaces; means normally urging said wedge members toward each other; and friction shoes interposed between said wedge members, said friction shoes each having a friction surface bearing upon the wedge surfaces of one of said wedge members; and means for effecting movement of said friction shoes at an angle to the movement of said wedge members dependent upon relative movement between said plunger and said friction elements.

3. In a shock absorbing mechanism for automobiles, the combination with a frame member and a spring member; of a housing secured to said frame member and provided with top and bottom walls, each having a centrally disposed opening therein, and an aperture at each side of said central opening; of a plunger secured to the other of said members and adapted to move relatively to said housing through the central openings in the top and bottom walls of said housing, said plunger being tapered in a direction toward said housing; wedge castings disposed in said housing and arranged adjacent the upper and lower walls thereof, each of said castings having guide stems thereon extending through the apertures in the adjacent wall, each of said castings being provided with spaced wedge surfaces diverging in a direction toward each other, coiled springs disposed about the stems of each of said castings and interposed between the latter and the adjacent wall of said housing; and friction shoes provided with tapered friction surfaces engaging said plunger, and each of said shoes having adjacent friction surfaces disposed in contact with the adjacent spaced friction surfaces of one of said wedge castings.

4. As an article of manufacture, a wedge casting comprising side walls between which are disposed spaced wedge surfaces extending in opposite directions, said casting having bearing portions at opposite sides thereof arranged at points remote from the engaging portions of said friction surfaces, each of said bearing members having a guide stem extending outwardly therefrom.

In witness that I claim the foregoing I have hereunto subscribed my name this 9th day of October, 1926.

JOHN F. O'CONNOR.